United States Patent [19]

Severs

[11] 3,742,680

[45] July 3, 1973

[54] APPARATUS FOR SEPARATING PARTICULATE MATTER FROM A GASEOUS SUSPENSION

[75] Inventor: Richard K. Severs, Houston, Tex.

[73] Assignee: Scientific & Educational Services, Inc., Houston, Tex.

[22] Filed: Apr. 19, 1971

[21] Appl. No.: 135,365

Related U.S. Application Data

[63] Continuation of Ser. No. 729,775, May 16, 1968, abandoned.

[52] U.S. Cl. .................. 55/103, 55/108, 55/138, 55/155, 55/DIG. 38
[51] Int. Cl. .................................................. B03c 3/30
[58] Field of Search .................. 55/101, 102, 103, 55/130, 131, 154, 155, DIG. 38, 108, 138

[56] References Cited
UNITED STATES PATENTS

| | | | |
|---|---|---|---|
| 1,357,886 | 11/1920 | Meston | 55/130 |
| 2,114,682 | 4/1938 | Gumaer | 55/103 X |
| 2,275,001 | 3/1942 | Anderson | 55/130 |
| 3,157,479 | 11/1964 | Boles | 55/152 X |
| 3,247,091 | 4/1966 | Stuetzer | 204/299 |
| 3,307,332 | 3/1967 | Grace et al. | 55/103 |
| 3,309,915 | 3/1967 | McEven et al. | 310/2 X |
| 3,344,062 | 9/1967 | Kosar | 210/40 X |
| 3,478,494 | 11/1969 | Lustenader et al. | 55/152 X |

FOREIGN PATENTS OR APPLICATIONS

| | | | |
|---|---|---|---|
| 168,565 | 6/1951 | Austria | 55/103 |
| 716,868 | 10/1954 | Great Britain | 55/155 |
| 792,068 | 3/1958 | Great Britain | 55/103 |

Primary Examiner—Dennis E. Talbert, Jr.
Attorney—Burton E. Levin

[57] ABSTRACT

Apparatus is described for separating electrically charged solid or liquid particulate matter from a gas stream in which such particulate matter is suspended, including an electrically insulated flue through which the suspension is passed, a perforate wall in this flue and a collecting electrode located outside the flue opposite and spaced from the perforate wall. Such arrangement provides maximum field intensity at the point of perforation and accelerates the particulate matter through the perforation to the collecting electrode where it is discharged. Means are also described for charging the particulate matter by turbulent flow of the gaseous suspension; for controlling the flow of gas through the perforate wall by adjusting the size of the perforations and the pressure differential across the perforate wall; for containing the separated and discharged particles by enclosing the perforate wall and the collecting electrode; and for removing the particles from this enclosure. Such apparatus can be used to effect essentially complete separation of the gaseous and particulate components of a suspension, to concentrate particulate matter in a portion of the gas stream in which it is suspended or to transfer particulate matter suspended in a gas stream to a second gas stream.

9 Claims, 7 Drawing Figures

PATENTED JUL 3 1973

INVENTOR.
Richard K. Severs

INVENTOR.
Richard K. Severs
BY ic precipitator embodying this invention.
APPARATUS FOR SEPARATING PARTICULATE MATTER FROM A GASEOUS SUSPENSION

REFERENCE TO RELATED APPLICATION

This application is a continuation of my application, Ser. No. 729,775, filed May 16, 1968 and now abandoned.

BACKGROUND OF THE INVENTION

1. Field of the Invention

This invention relates to apparatus for electrostatically concentrating particulate matter suspended in a gas stream. More particularly, it is concerned with devices for concentrating and precipitating this matter at a point outside the major flow path of the suspending gas.

2. Description of the Prior Art

Numerous devices are known and widely used to effect separation of liquid and solid particulate matter from a gaseous suspension by electrostatically charging the suspended particles in the gas stream and attracting these charged particles to a collecting electrode, which is maintained at a different potential, where these particles are neutralized and precipitated as agglomerates.

A typical simple device of this type includes a discharge electrode, such as a wire which carries a high voltage, direct current, which is within a metal tube of opposite polarity. This tube serves the multiple function of a conduit for the gaseous suspension, a collecting electrode and a receptacle for the precipitated agglomerates. While such device may perform in a satisfactory manner with low velocity gas streams, its efficiency decreases rapidly with increasing gas velocities due to resuspension of the precipitated particles. Merely increasing the diameter of the tube seldom represents a practicable solution to this problem, as both the size and power requirements soon become excessive for many industrial and transportation applications.

A modification of this simple device, which markedly improves its capacity to handle high velocity gas streams, involves the use of a perforate metal tube. Such perforate tube contains substantially all of the gas, but permits charged particulate matter which, because of its electrostatic field induced velocity, escapes through the perforations to be neutralized and precipitated on the outside surface of the tube. This outside surface is generally located in a dead air space or a zone of low gas velocity in order to minimize the possibility that the precipitated particles will become suspended in the atmosphere. In spite of the capacity of such a modified precipitator to handle high velocity gas streams, its usefulness is limited by a number of inherent disadvantages.

Among these disadvantages is the requirement of a high power input to compensate for the repeated recharging of suspended particles that occurs within the tube. This is a result of the fact that a large portion of the charged particles which are accelerated radially under the influence of the electrostatic field strike the inner surface of the metal tube where they are neutralized, precipitated and immediately resuspended by the high velocity gas stream. The necessity to recharge particles within a perforate tubular collecting electrode also limits the selection of means for charging particles which may be employed with precipitators of this type. For example, it seldom is possible to achieve satisfactory separation of particulate matter in a perforate tubular collecting electrode precipitator when particle charging is effected externally, as by turbulent flow of the gaseous suspension through a restricted passage immediately prior to entry into the perforate tube.

A second and perhaps greater disadvantage of such precipitator is the fact that a sizable portion of the particulate matter which is deposited on the outside surface of the perforate collecting electrode falls back into the perforations under the influence of gravity or vibrations and is entrained by the high velocity gas stream. Although liquid particulates are particularly susceptible to such reentry, solid particulates are often more troublesome as large agglomerates may plug or significantly restrict the perforations.

SUMMARY

It is an object of this invention to provide apparatus for separating particulate matter from a gaseous suspension which minimizes or eliminates the aforementioned disadvantages of the prior art electrostatic precipitators. More particularly, it is an object of this invention to provide efficient electrostatic precipitation apparatus which has a low power requirement and which is suitable for use in the purification of high velocity gas streams. A specific object is to provide a simple and compact device which can be installed in an automobile exhaust system to remove the toxic particulate matter that is present in the exhaust gases of an internal combustion engine burning a heavy metal bearing fuel, such as gasoline containing tetraethyl lead or similar tetraalkyllead compounds.

It has now been found that these objectives and other disadvantages, which will be apparent to those skilled in the art from the following description, can be realized by employing the apparatus of this invention. Broadly, this invention is apparatus for separating electrostatically charged liquid or solid particulate matter from a stream of a gaseous suspension of said particulate matter comprising an electrically insulated gas flue having an inlet at one end, an outlet at the other end and a perforate wall, in combination with a collecting electrode located outside said flue opposite and spaced from said perforate wall.

DESCRIPTION OF PREFERRED EMBODIMENTS

As indicated above, the electrically insulated flue in the simplest embodiment of this invention may have a single small hole in its wall which faces a single unenclosed small collecting electrode. While such simple device may be entirely adequate for many purposes, numerous variations of this basic scheme which enhance operating efficiency or flexibility, are possible without departing from this inventive concept. For example, separating efficiency is generally improved by providing a number of routes through which the charged particulate matter can be withdrawn from the flue and be neutralized. Similarly, it is usually advantageous to at least partially enclose the space between the perforate wall and the collecting electrode to prevent the escape of charged particles into the atmosphere where they may become and remain airborne. The use of a non-conductive or self-insulating flue is likewise preferred because of the fact that, unlike a metal flue, no separate electrical insulation is needed and no induced charge is built up on its outside surface during operation of the apparatus. A self-insulating flue made of a plastic, such as polypropylene, polystyrene, polyvinylchloride or poly (fluoroethylene), or a ceramic, such as porcelain, or glass or any other material which has a dielectric constant higher than that of the gas in the flue (or of air) also improves separating efficiency. Such flue functions as a dielectric shield which results in maximum electrostatic field intensity at the flue wall perforations and therefore greatest radial acceleration of the charged particles through the flue wall perforations.

Figure 1:
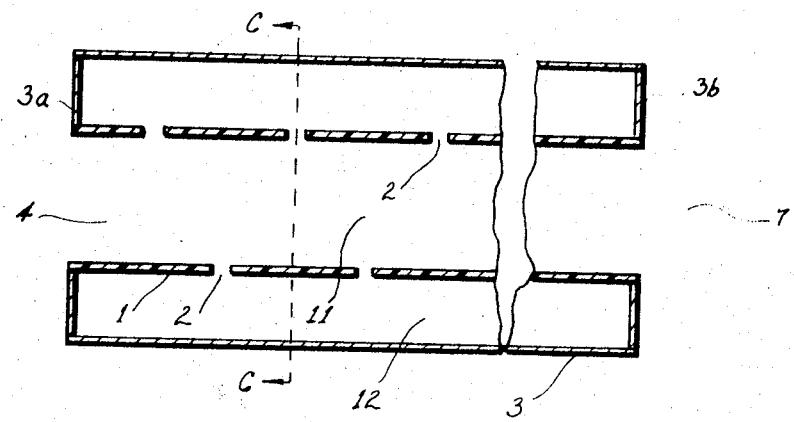
FIG. 1 is an elevated sectional view of an electrostatic precipitator embodying this invention.

While these and other refined embodiments of the apparatus of this invention are illustrated in FIG. 1, this drawing and the following description will provide a full understanding of the mode of operation of any electrostatic precipitator utilizing the basic inventive concept described above.

In the apparatus illustrated in FIG. 1, the gaseous suspension of particulate matter, which is electrostatically charged externally by any suitable means (not shown), such as by corona discharge or turbulent motion, enters the electrically insulated gas flue 1 (shown as a dielectric tube) through inlet 4. As the suspension moves through the passage 11 defined by the walls of the flue, the charged particles are accelerated radially through the perforation 2 (shown as a single helical slit) in the flue wall to the collecting electrode 3 (shown as a metal sleeve surrounding the flue), which is separated from the flue wall by space 12. Upon striking the collecting electrode, which may be grounded or maintained at any potential different from that of the charged particles, the particles lose their electrostatic charge and often agglomerate. The gases leave the flue through outlet 7 and perforation 2.

For most applications, the perforation or perforations are advantageously sized to permit passage of the particulate matter while providing a gas pressure drop that is less than about half of the total pressure drop through the flue, thereby preventing the major portion of the gas in the flue from passing into space 12. Such gas flow control may also be effected by equalizing the pressures in passage 11 and space 12 by enclosing the latter by the addition of closure discs 3a and 3b which extend inward from the ends of sleeve 3 to the outer wall of the perforate flue 1. These closure discs also serve to retain neutralized particulate matter within space 12. Since these particles are neutralized at a point remote from the wall of the flue, little of this material falls back through the perforations into the stream of gas in passage 11.

Figure 2:
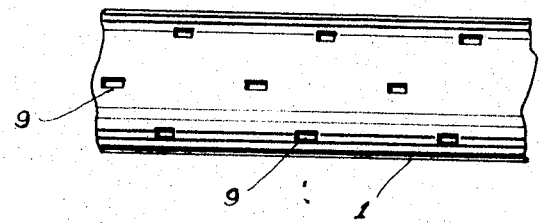
FIG. 2 is a fragmentary, elevated, axial view of a representative embodiment of the perforate walled flue of this invention.
Figure 3:
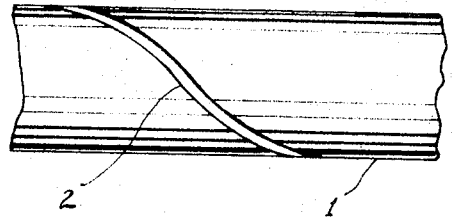
FIG. 3 is a fragmentary, elevated, axial view of another representative embodiment of such perforate walled flue, as shown in FIG. 1.

Numerous variations of the apparatus illustrated in FIG. 1 are possible. For example, the helical slit 2 in flue 1, which is shown in another view in FIG. 3, may be replaced by any of a wide variety of multiple perforations of a convenient shape, such as the rectangular slits 9 shown in FIG. 2. These multiple perforations may be located at any point on the wall of the flue. When the flue is to be used in a horizontal position, the probability that neutralized particles will drop back through the perforations can be further reduced, as shown in FIG. 6, by locating the perforations 9 only in positions where they do not open upwardly.

Figure 4:
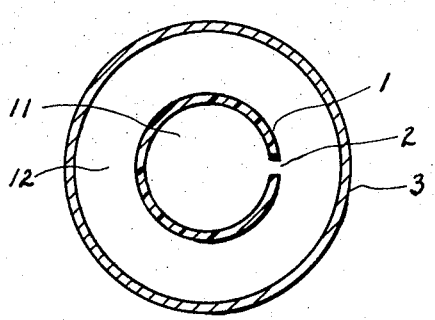
FIG. 4 is a sectional view taken along line c—c of FIG. 1.
Figure 6:
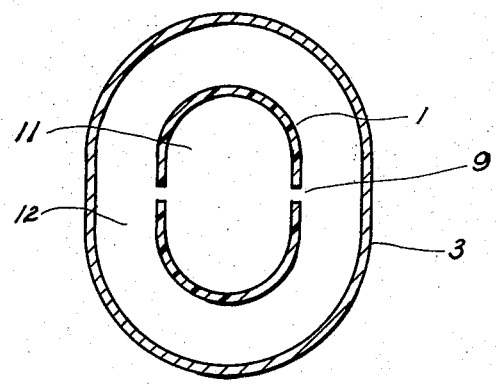
FIG. 6 is a sectional view taken along line c—c showing a modification in the shape of the flue and sleeve.

Similarly, the round tubular flue 1 and sleeve 3 of the apparatus of FIG. 1, which are shown in another view in FIG. 4, may be of any convenient shape, such as the flattened tubular flue and sleeve shown in FIG. 6.

Figure 5:
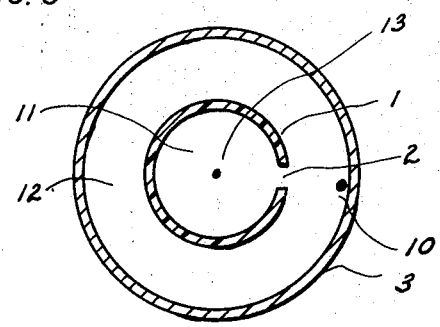
FIG. 5 is a sectional view taken along line c—c of FIG. 1 showing the optional location of a discharge electrode and a modification of the collecting electrode.

The flue 1 may also contain means for electrostatically charging particulate matter in the gaseous suspension to be treated. For example, FIG. 5 illustrates a high voltage thin wire discharge electrode 13 which extends through passage 11 in the insulated flue 1 and is held in this position by any suitable electrical connections at its ends. Such internally located discharge electrode may be employed as the sole means for electrostatically charging the suspended particulate matter or it may be used to augment the self generated repulsive force of particles that have been charged externally. FIG. 5 also illustrates a thin wire 10 which is attached to sleeve 3 directly opposite to helical slit 2 in flue 1. The presence of such a sharp edge or point on the collecting electrode concentrates the electrostatic lines of force and often enhances collecting efficiency, particularly when combined with an internal discharge electrode.

Referring again to FIG. 1, the presence and configuration of closure discs 3a and 3b is optional, depending largely on the particular use for which the apparatus is designed. When, as shown in this drawing, that portion of the space 12 enclosure formed by these discs and sleeve 3 is substantially airtight, space 12 becomes a quiescent zone in which gravity is substantially the only force acting on the neutralized particles. Such apparatus is well adapted for separating and accumulating small particulate matter that does not readily agglomerate and might therefore remain airborne if discharged into the atmosphere. When necessary, neutralized particles adhering to the sleeve 3 may be loosened by any suitable jarring or scraping means (not shown), as is well understood in the art. Similarly, provisions are advantageously made for removing the accumulated, neutralized particles. This may be accomplished simply by periodically removing one or both of discs 3a and 3b and cleaning space 12.

For many applications, it is not necessary that space 12 be a completely quiescent zone or dead air space. For example, if one omits one or both of closure discs 3a and 3b and properly sizes the perforations 2 so as to provide a low gas velocity in space 12, the apparatus is often nearly as effective as that described above for precipitating and accumulating particulate matter. An increase in this gas velocity, conveniently accomplished by enlarging the perforations 2, may be employed, in place of scraping or jarring means, to sweep this precipitated material out of space 12 without resuspending it. Further increases in the velocity of the gas escaping from the flue 1 into space 12 may resuspend certain particulate matter. Such devices are useful in numerous industrial processes requiring concentrated suspensions of the particulate matter in a portion of the original suspending gas. Transfer of the suspended particles to a second gas stream may also be accomplished with this open end sleeve by sweeping space 12 with a high velocity stream of the second gas.

A particularly preferred embodiment of this invention is an electrostatic separating device comprising A) means for electrostatically charging liquid or solid particulate matter that is suspended in a gas stream and for introducing this charged suspension into B) an electrically self insulated flue of a material having a higher dielectric constant than the introduced gases and a melting point of at least about 500° F, the flue having an inlet at one end, an outlet at the other end through which a major portion of the gases are withdrawn and a perforate wall and C) an electrically grounded metal sleeve axially disposed around and spaced from the flue. Devices of this type are well adapted for separating toxic suspended particulate matter from the hot, high velocity exhaust gases of an internal combustion engine that burns a heavy metal bearing fuel. When they require no input of electricity, as in the case of frictional electrostatic charging, and 90 percent or more of the gases leave the flue through its outlet, rather than through the perforations, such devices are uniquely suited for the removal of potentially air polluting particles having a diameter of less than about 2 angstroms which are emitted by automotive engines that use gasoline containing tetraalkyl lead compounds.

Figure 7:
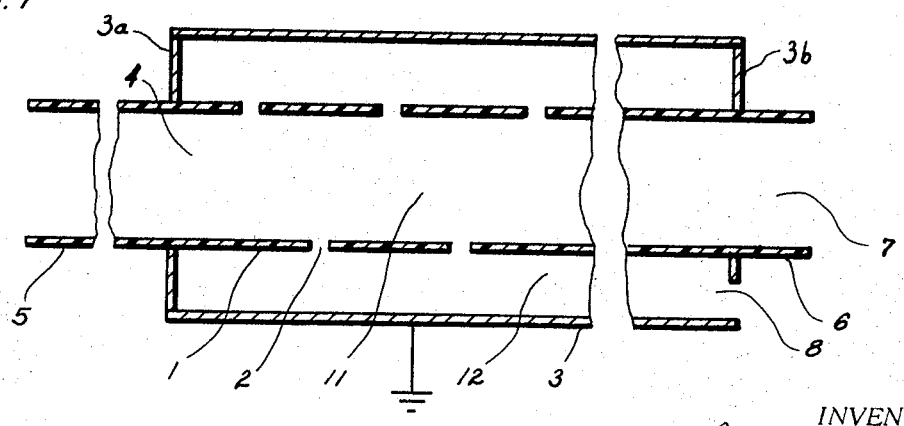
FIG. 7 is an elevated sectional view of a preferred embodiment of this invention which is suitable for use in an automobile exhaust system.

A typical device of this type, which is designed for installation in the exhaust system of an average six passenger American automobile having a low speed exhaust linear velocity of about 20 feet per second through a 2 inch pipe, is illustrated in FIG. 7. The exhaust which typically contains particles of an average diameter of less than 5 microns at a loading of about 0.1 grams per cubic foot, passes through a 2 foot length of 2 inch I.D. rigid poly (perfluoroethylene) tubing 5 in which turbulent flow (a Reynolds number of about 20,000) charges the particles to an average of about 200 electron volts. The charged suspension is then introduced into the inlet 4 of perforate flue 1. The flue, which is 4 feet from its inlet 4 to its outlet 7, is also 2 inch I.D. rigid poly (perfluoroethylene) tubing, but it has a single one-fourth inch wide helical slit 2 running its length. The area of this perforation is less than 10 percent of the total surface area of the flue. The self induced repulsion of the charged particles moving through passage 11 accelerates them radially through slit 2 to grounded metal sleeve 3 where they are neutralized. Sleeve 3, which encases the flue and is separated from its outer surface by a distance of one inch, is secured to the flue by metal enclosing discs 3a and 3b extending inwardly from the ends of the sleeve to the ends of the flue. Disc 3a faces the direction of forward movement of the automobile and prevents the flow of air from sweeping through space 12. Disc 3b has an opening 8 through which neutralized and agglomerated particles that have been shaken from the inner surface of sleeve 3 can fall harmlessly to the road. Because of the condensation of water vapor and the precipitation of oily particulates on the inner surface of the sleeve, few if any of the particles passing out of opening 8 are of a size that can easily become or remain airborne. This remote possibility can, of course, be further minimized by plugging opening 8 and removing the plug (not shown) periodically in a suitable place and manner to remove accumulated particulates. When such plug is employed, it may also reduce the quantity of exhaust gas that leaves the flue 1 through slit 2. In either case, the bulk (over 90 percent) of the exhaust gas is expelled through outlet 7 into a short solid walled extension 6 of the flue which serves as a convenient point of connection for the automobile exhaust pipe.

Although the separating efficiency of such preferred apparatus is an inverse function of the residence time of the charged particles in the perforate flue, its effectiveness in removing suspended particles from an automobile exhaust is not significantly diminished by high speed engine operation. The shortened residence time resulting from the high speed emission of greater volumes of exhaust is accompanied by and largely compensated for by increased turbulence in the frictional charging tube and a higher average charge on the particles. It can therefore be useful over substantially the entire operating range of any internal combustion engine.

While the invention has been described above primarily in connection with certain preferred embodiments thereof, it will be understood by those skilled in the art that various additional changes and modifications may be made without departing from the spirit and scope of the invention as expressed below.

I claim:
1. Apparatus for separating particulate matter from a stream of a gaseous suspension of said particulate matter comprising
   a. an elongated dielectric gas flue having an inlet at one end, an outlet at the other end and a wall section intermediate said ends, said wall section containing at least one perforation,
   b. frictional electrostatic charging means communicating with the inlet of said gas flue and
   c. a metal collecting electrode located outside said flue opposite and spaced from said perforation, each metal electrode in said apparatus being electrically grounded.
2. The apparatus of claim 1 wherein said flue is composed of a poly(fluoroolefin).
3. The apparatus of claim 2 wherein said electrostatic charging means is a, solid wall poly(fluoroolefin) extention of said flue at its inlet end.
4. The apparatus of claim 1 wherein said collecting electrode is a metal sleeve axially disposed around said flue.
5. The apparatus of claim 4 having closure means substantially enclosing the space between said gas flue and said sleeve.
6. The apparatus of claim 1 wherein said gas flue contains multiple perforations.
7. The apparatus of claim 1 wherein said total perforation area is less than about 10 percent of the surface area of said flue.
8. The apparatus of claim 1 wherein said gas flue contains a single helical perforation.
9. Apparatus for separating suspended particulate matter from a stream of a gaseous suspension of said particulate matter comprising a. a poly(fluoroethylene) tube having a melting point of at least about 500° F, said tube having a solid wall frictional charging section at its inlet end, a solid wall exhaust section at its outlet end and a perforate wall section intermediate said solid wall sections, said perforate wall section having a single helical perforation and said total perforation area being less than about 10 percent the surface area of said perforate wall section b. an electrically grounded metal sleeve collecting electrode disposed around and spaced from said perforate wall section, said sleeve being the only metal electrode in said apparatus, c. closure discs extending outward from said tube to each end of said sleeve and substantially enclosing the space between said perforate wall section and said sleeve and d. means for removing precipitated particulate matter from said space.

* * * * *